United States Patent [19]

Masunaga

[11] Patent Number: 4,466,724
[45] Date of Patent: Aug. 21, 1984

[54] RELEASE CONTROL DEVICE FOR CAMERA

[75] Inventor: Makoto Masunaga, Tokyo, Japan

[73] Assignee: Canon Kabushiki Kaisha, Tokyo, Japan

[21] Appl. No.: 389,563

[22] Filed: Jun. 17, 1982

[30] Foreign Application Priority Data

Jun. 26, 1981 [JP] Japan .................................. 56-100166
Jun. 30, 1981 [JP] Japan .................................. 56-102014

[51] Int. Cl.³ .............................................. G03B 3/10
[52] U.S. Cl. .................................................. 354/402
[58] Field of Search ........................ 354/25, 195, 238

[56] References Cited
U.S. PATENT DOCUMENTS 4,199,235  4/1980  Matsuda et al. ...................... 354/25
4,219,260  8/1980  Date et al. ......................... 354/23 D
4,350,418  9/1982  Taguchi et al. ................... 354/238 X Primary Examiner—Michael L. Gellner
Attorney, Agent, or Firm—Toren, McGeady and Stanger

[57] ABSTRACT

In the disclosed device, a timer delays operation of a focus control until sufficient time has elapsed for a range finder to measure the distance to an object. According to an embodiment, depressing the shutter button to a first position actuates the range finder and, depressing it to a second position, actuates a focus control. A timer prevents actuation of the focus control if the shutter button is depressed to the second position before the time allotted for the operation of the range finder has elapsed.

6 Claims, 7 Drawing Figures

RELEASE CONTROL DEVICE FOR CAMERA

BACKGROUND OF THE INVENTION

1. Field of the Invention

This invention relates to cameras, and particularly to release devices therefor. The invention is especially directed to cameras in which depression of a shutter release button to a first position or step connects the camera circuitry to a power source and actuates a range finder as a preliminary setting for photography, and in which depressing the shutter to a second position or step focuses the lens in response to the range finder, sets the exposure, and starts subsequent actions. Depression to the second position thus serves as a trigger for photography.

2. Description of the Prior Art

In general, photographic operations in a camera are carried out in response to operation of a so-called release button, shutter release button, or shutter button. Along with recent advances which involve electronics for a camera, many types of cameras use the shutter button to connect the circuits to a power source, and to initiate the processing of various types of data such as range finding before the photographic operation. In such a camera, the shutter button is depressed to a first position for connecting the circuitry to a power source and performing pre-photographic actions, and to a second position for effecting the photographic action, such as control of the lens position and setting the exposure. That is, the power source connection and preliminary photographic actions are carried out by depressing the release button to its first position in response to which the range finding operation is confirmed in the display, the results of the range finding operation are displayed, and the exposure data are displayed. Control of the lens position, exposure of the film, and if necessary the film winding are accomplished by depressing the release button to the second position.

Various types of digital electrical circuits or microcomputers have been built into cameras. The general tendency is for such systems to digitally carry out exposure computation and range finding operations. However, digital types of processing systems have the inherent shortcoming of requiring finite lengths of time for processing data. Increases in the cost or increases in the power consumption would be unavoidable for speeding up the time needed to process the data. Data processing for range finding requires complicated operating routines and results in the need for a comparatively long period of time. Also, in systems employing CCD's for range finding, such as the range finding system disclosed in U.S. patent application Ser. No. 298,532, filed Sept. 1, 1981 by the Assignee of the present application, requires a finite length of time for accumulating the charge in the CCD's and for checking the length of time. When the scene is dark, the length of time needed may sometimes be as long as 0.5 seconds. In some cases, a range finding completion signal will not be produced.

When such a range finding system is built in a camera, as described in the aforementioned U.S. patent application Ser. No. 298,532, the range finding and accompanying computation as well as exposure measurement are performed in response to the shutter button reaching the first position or step. Control of the lens position as well as subsequent photographic operations are performed when the shutter button reaches the second stroke. Here, it is essential that the distance measured by the range finding device be available for effecting control of the lens position. Therefore, an operator is limited in using this type of camera because the operator must wait for completion of the range finding process after the shutter button reaches the first step, and only after the range finding is completed and the results thereof confirmed by an indication within a viewfinder or by sound, depress the button to the second position for effecting the remaining photographic operations. However, often an operator will perform the first stroke and the second stroke in a single action and disregard the above limitation. In this case, the lens focusing may be performed without the results of the range finding operation. This introduces a great risk in that the lens will not reach its prescribed position and will therefore be out-of-focus when the picture is taken.

In order to overcome these disadvantages, the present inventor has proposed that when the second position is reached in depressing the shutter button while the range finding result has not been obtained after the first position, the lens is moved only after range finding operations have been done for a prescribed number of times. However, this arrangement makes the set up complicated and demands for more economical systems have been rather keen.

In U.S. Pat. No. 4,219,260, issued on Aug. 26, 1980, the present inventor discloses countermeasures for incorrect exposure measurements due to premature depression of a shutter button which shortens the photosensing time. This serves to control the length of time required for an operating signal to be generated by an exposure control mechanism corresponding to the magnitude of an output of a photosensing circuit for stabilizing the operation of the photosensing circuit and thereby obtain an appropriate exposure. However, the aforementioned proposal fails to concern itself with the problem caused by premature depression of the shutter button with respect to range finding.

SUMMARY OF THE INVENTION

It is an object of the present invention to provide an improved release control device for a camera, which overcomes the disadvantages of prior art devices.

It is another object of the present invention to provide a novel release control device for a camera, so that when a shutter button is depressed to a second position, while a range finding operation which should have been done at the time of depression of a first stroke has not been completed, the length of time virtually required for a range finding action is counted. Thereafter a series of photographic operations including lens control are carried out. This reduces the frequency at which disadvantageous conditions caused by the premature depression of a shutter button will occur.

It is a further object of the present invention to provide a novel camera release device, so that when a shutter button is depressed to a second position, while a range finding action which is to be carried out at the time of depression of a first stroke has not been completed, the length of time required for the range finding is counted by a timer which is set to a limit time virtually corresponding to the brightness, whereupon a series of photographic operations including the lens control are carried out. This reduces the frequency of disadvantageous conditions occurring.

These and other objects and features of the present invention will become apparent from the following detailed description of embodiments thereof taken in connection with the accompanying drawings.

DESCRIPTION OF THE PREFERRED EMBODIMENTS

Now the present invention shall be explained in further detail referring to the drawings.

Figure 1:
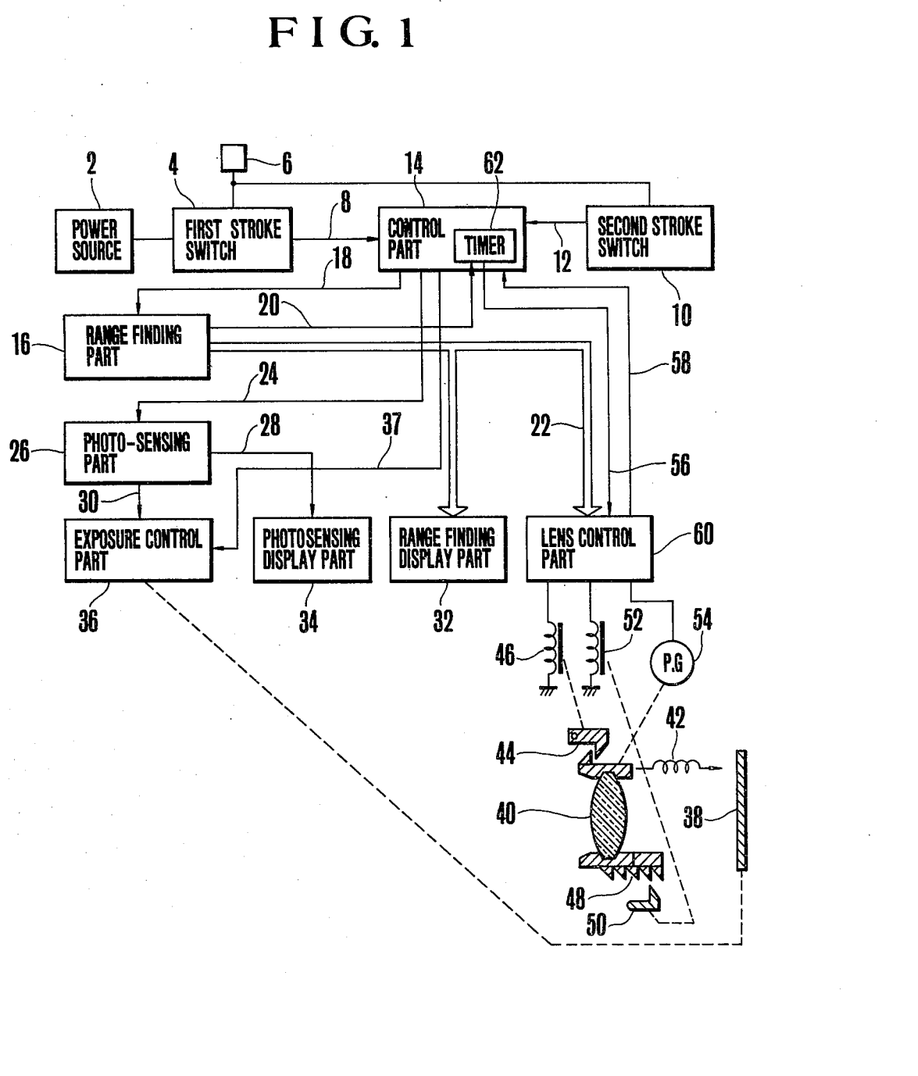
FIG. 1 is a block diagram of a release device for a camera as an example of the present invention.

FIG. 1 includes a power source 2, and a first position switch 4 to supply power to a power source 8 when a shutter button 6 reaches a first position or step. A second position switch 10 supplies a second position or step signal to a signal line 12 when the shutter button 6 reaches a second position or step. A control part or control 14 effects a sequence control of a pre-photographic operation along with initiation of power supply from the power source line 8 and receives the second position signal from the signal line 12 for effecting sequence control of a photographic operation. A range finding part or range finder 16 measures the distance to an object based on a range finding instruction (given) from the control part 14 through a signal line 18, and transmits a range finding completion signal to the control 14 through a signal line 20 when an effective distance datum is obtained. At the same time, the finder 16 produces range finding data and applies the same to a data line 22. What is shown as 26 is a photosensing part, or photosensor, to sense object brightness based on a photosensing introduction received from the control 14 through a signal line 24 and at the same time to produce a photosensing result through signal lines 28, 30. What is shown as 32 is a range finding display 10 or display, that displays distance based on the range finding data from the data line 22. A photosensing display part or photosensor display 34 displays the photosensing result received from the photosensing part 26 through the signal line 28. An exposure control part or exposure control 39 controls a shutter 38 based on the photosensing result applied by the photosensing part 26 to the signal line 30 when an exposure control instruction appears at the control 14 through a signal line 37. Member 40 is a photo-taking lens. Member 42 is a spring to provide a biasing force to pull the photo-taking lens 40 toward an infinite position along the optical axis, and member 44 is a checking member to hold the photo-taking lens 40 at the reference position at the close up end against the biasing force 42. A start magnet serves to release a checking force of the checking member 44 for starting a pull out of the photo-taking lens 40 by the biasing power of the spring 42 to an infinite position and member 48 is a rack tooth to stop a pull out of the photo-taking lens 40 toward an infinite position at a desired position by engagement with a stop claw 50. A stop magnet 52 releases the engagement between the stopping claw 52 and the rack tooth 48 and engages the stopping claw 50 with the rack tooth 48 in response to stopping of the power supply. A pulse generator 54 produces a pulse train in association with the pulling out of the photo-taking lens. What is shown as 60 is a lens control part or lens control which causes the start magnet 46 to start a pulling out of the photo-taking lens 40 based on a starting instruction sent from the control part 14 through a signal line 56 and compares the control data prepared from the range finding data introduced by the range finder part 16 through the data line 22 with a count value of the pulse signal from the pulse generator 54 producing pulses in response to movement of the photo-taking lens 40. When the both of them match each other, the lens control 60 stops power supply to the stop magnet 52 for stopping the photo-taking lens 40 at a desired position, and applies a lens control completion signal to a signal line 58. Element 62 is a timer which is included in the control part 14 and produces a lens start instruction for the lens control part to wait for a prescribed length of time, when a second position of the depressed shutter button 6 is reached even if a range finding completion signal has not come from the range finding part 16.

Figure 2:
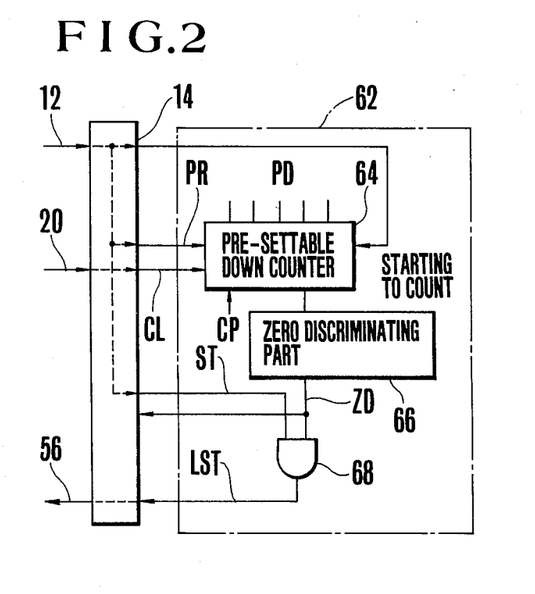
FIG. 2 is a block diagram showing a detailed arrangement of the timer in FIG. 1.

FIG. 2 is a block diagram showing details of the timer 62 shown in FIG. 1. In FIG. 2, a presettable down counter 64 takes in a preset value PD set by the control part 14 based on a presetting signal PR generated by depression of the second position switch 10, and at the same time carries out a count-down of the preset value by counting pulses CP. The down counter 64 is reset to zero by a clear signal CL based on a range finding completion signal from the range finder 16. Circuit 66 is a zero discriminating part of zero discrimination to detect that the presettable down counter 64 has a zero indication, and 68 is an AND circuit to produce a start instruction LST for a lens based on the logic product of a start signal ST generated by depression of the second position switch 10 and a zero discrimination signal ZD from the zero discriminating part 66.

Figure 3:
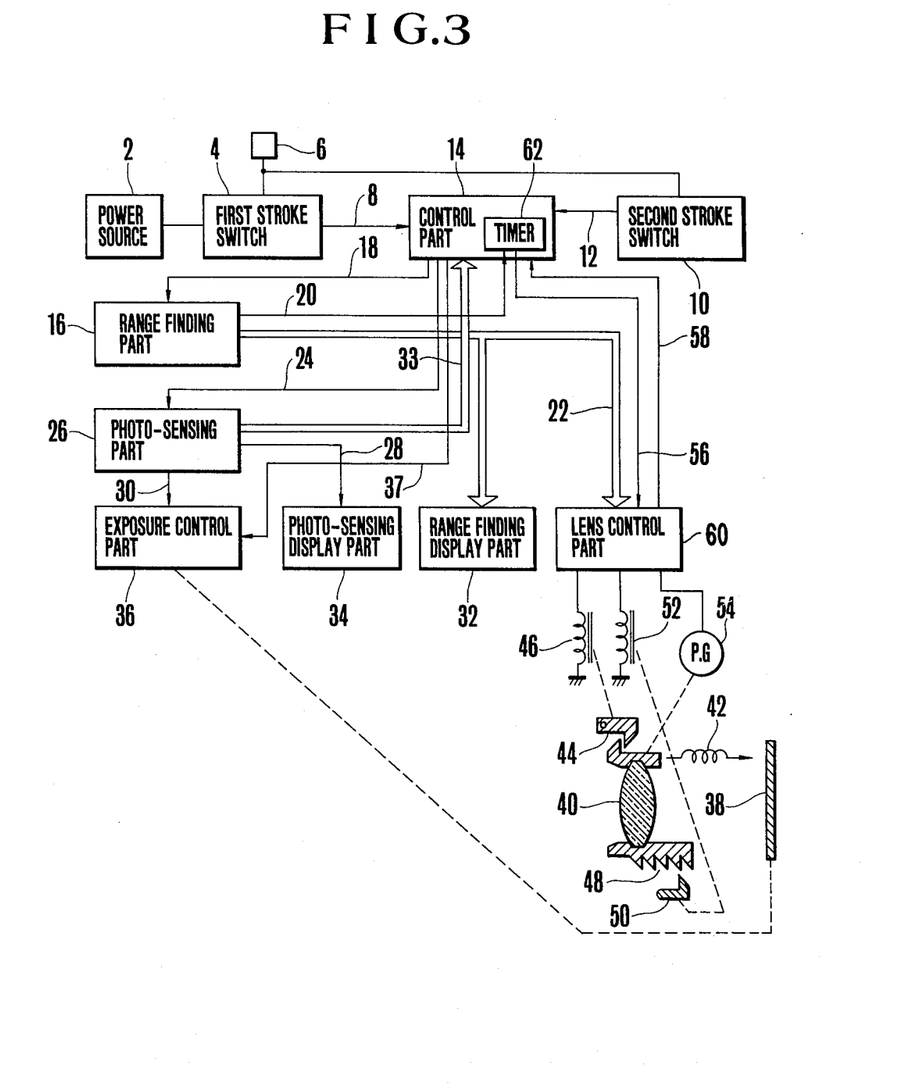
FIG. 3 is a block diagram of a camera release device as another example of the present invention.

FIG. 3 is a block diagram of a release device for a camera showing another example of the present invention. There parts having same structure as those in the device of FIG. 1 have the same reference numbers. In FIG. 3, the photosensor 26 senses object brightness in response to a photosensing instruction passed through the signal line 24 from the control 14, and at the time time applies the photosensing result through the signal lines 28, 30, while transmitting photosensing data to the control 14 through the data line 33.

The timer 62 in the control 14 works so that an output of a lens starting instruction for the lens control 60 is delayed for a time based on the photosensing data from the photosensor 26 when the shutter button 6 is depressed to the second position even though a range finding completion signal has not come from the range finding part 16. The arrangement mentioned above differs from what is shown in FIG. 1.

Figure 4:
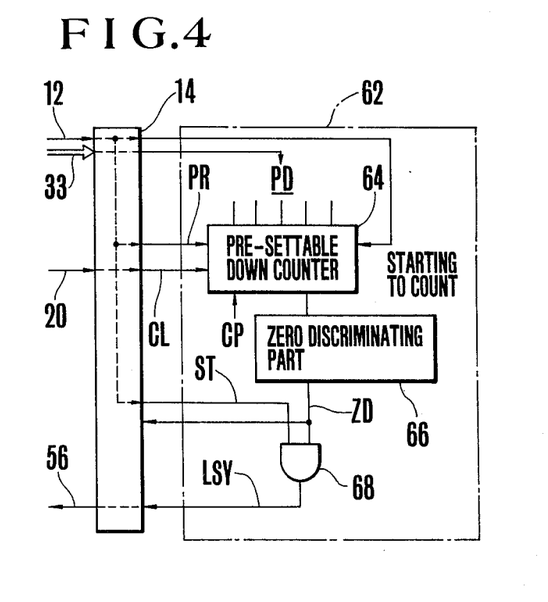
FIG. 4 is a block diagram showing a detailed arrangement of the timer in FIG. 3.

FIG. 4 is a block diagram illustrating details of the timer 62 shown in FIG. 3, and has almost the same arrangement as the timer of FIG. 2, but is different therefrom in that the presetting value taken in by the presettable down counter 64 in FIG. 3 is set at the control part 14 corresponding to the photosensing data.

Figure 5:
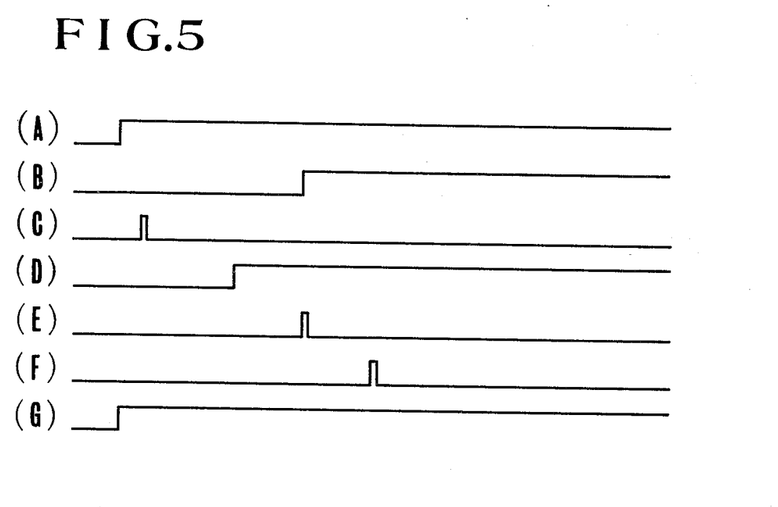
FIGS. 5, 6 and 7 are time charts explaining the operation of the set up shown in FIG. 1 and FIG. 3.
Figure 6:
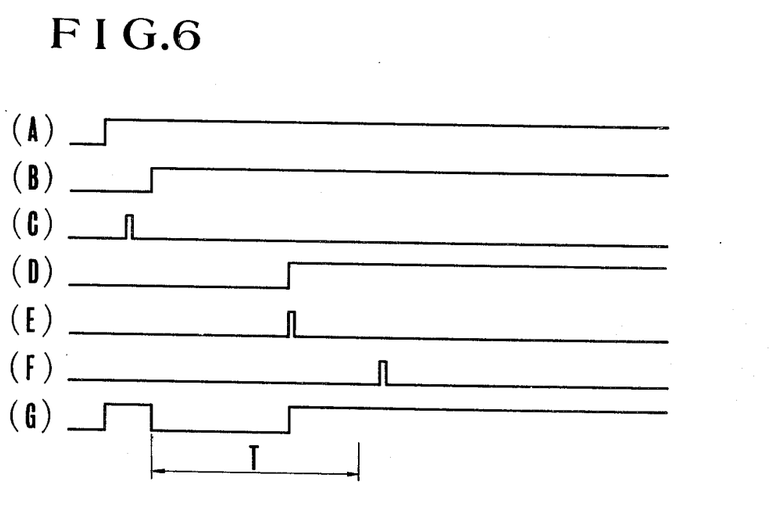
Figure 7:
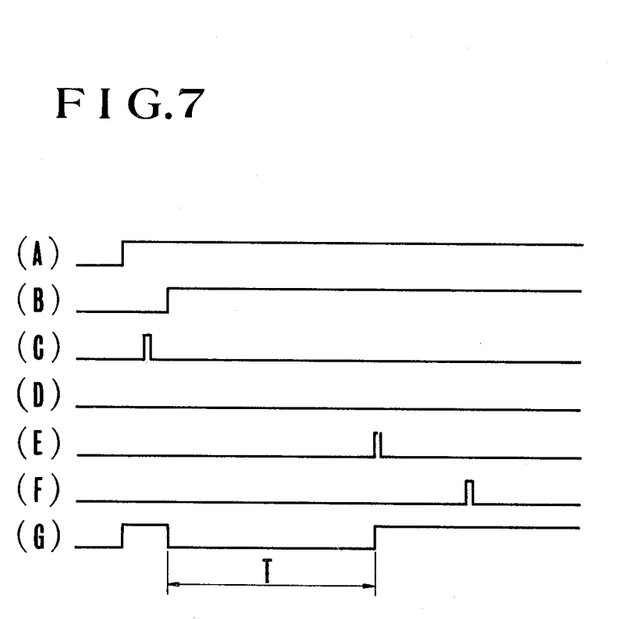

The operation of the devices shown in FIG. 1 and FIG. 2 will be best understood by the time charts shown in FIG. 5 to FIG. 7.

FIG. 5 shows waveforms during normal use. That is when the second position switch 10 is operated after the range finding operation has been completed. FIG. 6 shows conditions when a range finding operation has been completed after the second position switch 10 is operated by a premature depression of the shutter button 6 but before a completion of a limit time of the timer. FIG. 7 shows conditions when a limit time of the timer has come after the second position switch 10 is operated by a premature depression of the shutter button 6 but before the range finding operation has been completed. In each of these drawings, graph (A) illustrates the timing of the first position switch 4, and graph (B) the timing of the second position switch 10, while graph (C) is a range finding instruction produced by the control 14 on the signal line 18. Graph (D) illustrates a range finding part 16 to the signal line 20, and graph (E) shows a lens starting instruction sent out from the control part 14 to the signal line 56. Graph (F) represents a lens control completion signal from the lens control part 60 to the signal line 58, and graph (G) shows an output signal of a zero discriminating part 66 in the timer 62.

Now, when the shutter button 6 is depressed to the first position or step and the first step switch 4 operates with the timing shown in FIG. 5(A), under the normal operating state of FIGS. 5(A) to 5(G), a supply of power from the power source 2 is applied to the control 14 through the power source line 8, and the control 14 starts a normal operation after placing circuits in an initial state by a power up clear circuit not shown in the drawing. The normal operation includes checking voltage in the power source 2 and a check of other operating parts, but they are not related to the purport of the present invention, and explanations thereof are omitted.

When a prescribed checking operation has been completed as power is applied, a range finding instruction from the control 14 arrives at the range finder 16 through the signal line 18 with timing shown in FIG. 5 (C), and a range finding operation is started by the range finder 16 following this instruction. On the other hand a photosensing instruction from the control arrives at the photosensor 26 through the signal line 24, and the photosensing result is delivered to the photosensing display 34 through the signal line 28 and is displayed there. Also, a range finding computation is accomplished following a prescribed routine at the range finder 16 to which the range finding instruction has geen given. This is done, for example, by a processing system such as that shown in U.S. patent application Ser. No. 121,690 filed on Feb. 15, 1980. Therefore it takes a certain length of time. Said length of time changes depending upon brightness of an object. When a range finding operation is completed after that, range finding data are sent from the range finding part 16 through the data line 22 and are introduced into the range finding display 32 and the lens control 60. At the same time, a range finding completion signal is sent from the range finder 16 to the control 14 through the signal line 20 with timing shown in FIG. 5 (D).

As a result, distance information is produced at the range finding display 32 and a photographer can recognize the same within a view finder, and determine that a photograph can now be taken.

On the other hand, the control 14 which has the range finding completion signal introduced therein works by applying the clear signal CL to the presettable down counter 64 to make outputs thereof in total bits zero. However, the shutter button 6 has not been depressed to the second position by this time. Thus, the counter has not taken in the preset value PD based on a presetting signal PR. Therefore, the zero discriminating signal ZD has already been produced by the zero discriminating part 66 and is applied to the AND gate 66. When the shutter button 6 is depressed to the second position in this state, with timing shown in FIG. 5(B), it is detected at the second position switch 10, and the second position signal goes to the control 14 through the signal line 12. Also the control 14 first produces the start signal ST in response to the second position signal and applies the signal ST to the AND gate 68. However the AND gate 68 has already received the zero discriminating signal ZD from the zero discriminating part 66. Therefore the lens starting signal LST is produced and is returned to the control 14. The control 14 upon receiving the lens starting signal LST produces the lens starting instruction with a timing shown in FIG. 5(E), and sends the same to the lens control 60 through the signal line 56.

The lens control 60 which has the lens starting instruction given thereto supplies power to the stop magnet 52 to release the engagement between the checking claw 50 and the rack tooth 48 and at the same time supplies power to the start magnet 46 to pull out the checking member 44 for starting a pull out operation of the photo-taking lens 40. That is the photo-taking lens 40 moves in response to the biasing force of the spring 42 from a reference position at a close up end toward the infinite end along the optical axis thereof. At the same time, the lens control 60 counts pulses generated from the pulse generator 54 along with a movement of the shifting lens 40 and compares the same with the range finding data introduced from the data line 22. As a result the comparison indicates that both of them match, the lens control 60 stops the power to the stop magnet 52 and has the checking claw 50 engage the rack tooth 48 to restrict the movement of the phototaking lens 40.

As a result of such control, the photo-taking lens 40 will be set to a position corresponding to the distance data obtained at the range finder 16. After that, a lens control completion signal is sent from the lens control 60 to the signal line 58 with timing shown in FIG. 5(F). The control 14 which receives the signal produces an exposure control instruction and sends the same through the signal line 37 to the exposure control 36. The exposure control 36 which has the exposure control instruction introduced thereinto controls an amount of exposure based on a photosensing result introduced from the photosensor 26 through the signal line 30 to carry out a control of an exposure over a film surface. Here, many kinds of devices are known for exposure control and it is not related to the purport of the present invention, therefore a detailed explanation thereof is omitted here.

As the above-mentioned exposure control is completed, the control 14 detects the same through a signal line not shown in the drawing and completes all photogracic operations. Also, if necessary, a motor control for film advance and moving of the photo-taking lens 40 to the reference position for a close up may be done by an instruction from the control 14 after that.

Referring to FIGS. 6 and 7, explanations shall be made on operations when the shutter button 6 is depressed prematurely. In FIGS. 6 and 7, when the shutter button 6 is first depressed to the first position with timing shown in FIG. 5(A) and the first position switch 4 is actuated, a supply of power starts from the power source 2 through the power source line 8 to the control part 14. Prescribed checking operations are made in a same manner as described before. Thereafter, the range finding instruction produced by the control 14 of the signal line 18 with timing shown in FIG. 5 (C) starts the range finding operation at the range finder 16. On the other hand, a photosensing operation occurs at the photosensor 26, and the result is displayed by the photosensing display 34. Also, a range finding operation is carried out at the range finder part 16 which receives the range finding instructions following a prescribed routine, and a certain length of time is needed therefor as mentioned.

When the shutter button 6 is depressed to the second position with timing shown in FIG. 5(B) during a period of time while the above-mentioned range finding operation is being done, the second position signal is received by the control 14. Therefore, the control 14 produces the start signal ST and the presetting signal PR for the presettable down counter 64 on the basis of the second position signal. As a result, in a device having the arrangement shown in FIG. 1, a prescribed presetting value PD is written for the presettable down counter 64 and said presetting value is counted down in synchronism with the count pulse CP. Also in a device having the arrangement shown in FIG. 3, the preset value PD produced in the control part 14 is written for the presettable down counter 64 based on the photosensing data from the photosensor 26 as a short time when it is bright and as a long time when it is dark, and the preset value is counted down in synchronism with the count pulse CP. Therefore, the zero detection is not done at the zero discriminating part 66 with a timing shown in FIG. 5(G). Hence the zero detection signal ZD for the AND gate 68 is not present. Therefore, even if the start signal ST is applied to the AND gate 68, a signal will not appear at the output of the AND gate 68.

Now, when the range finding operation is completed at the range finding part 16 when the presettable down counter 64 has not counted down to zero as shown in FIG. 6 (G) that is when a length of time T has not elapsed, as shown in a time chart of FIG. 6(D), the range finding data are sent from the range finder 16 through the data line 22 and are introduced into the range finding display 32 and the lens control 60. At the same time, the range finding completion signal is sent from the range finding part 16 through the signal line 20 to the control part 14. Therefore, the control 14 applies the clear signal CL to the presettable down counter 64 and sets all bits of the output thereof to zero. In this state, the zero detection signal ZD detected by the zero discriminator 66 is returned to the control 14 and at the same time is applied to the AND gate 68. Therefore, at this time, the lens start signal LST is emitted by the AND gate 68, and the lens start instruction based on this signal is received by the control 14 which transmits the signal to the lens control 60 with timing shown in FIG. 6(E).

The lens control 60 which receives the lens start instruction controls movement of the photo-taking lens 40 to the position corresponding to the range finding date in the same manner as described before, and the control 14 will carry out subsequent photographic operations.

At times when the presettable down counter 64 may be counted down to zero before the range finding operation at the range finder 16 is completed, as shown in FIG. 7(G),e.g., when the length of time T has elapsed, and the range finder 16 takes longer than a set time to complete the range finding operation or when the range finding cannot be accomplished, the total bits zero of the presettable down counter 64 at the zero discriminating part 66 is detected. Now the zero detection signal ZD is returned to the control 14, and at the same time applied to the AND gate 68. Therefore, the lens start signal LST is produced from the AND gate 68, and the control part 14 which receives the signal sends the lens start instruction based thereon to the lens control part 60 with a timing shown in FIG. 7(E). The lens control part 60 which receives the lens start instruction starts a pulling out of the photo-taking lens 40 through the starting magnet 46. As there is no range finding data available from the data line 22 at this time, control occurs based on the control data for pulling out the photo-taking lens 40 to a general focusing position.

As has been described above, when the arrangement employs data processing requiring a certain length of time, particularly when a range finding operation at an automatic focusing control device occurs at a first shutter button position and a lens position control is performed based on a result of the range finding at a second shutter button position in a camera which is operated by a shutter button having two depression modes as a fixed position and a second position, the frequency of disadvantages, such as the shutter button being depressed to the second position while the range finding result has not been obtained and a lens control cannot be done, can be minimized.

Also in the above example, the setting time of the timer 62, that is the preset value PD of the presettable down counter 64 must be set to a length of time required for carrying out a range finding operation for the range finder 16 or greater, as a matter of course. Also as an arrangement of the timer 62, other arrangements, for example, a known type of arrangement including an interruption of processing by a digital type counter and a micro-computer may be employed, or an analogue type delay circuit may be employed.

As has been explained above, according to the present invention, when preliminary operations for photography, that is, such operations as range finding, etc. are done at a first position of a shutter button and a series of photographic operations including a lens position control based on range finding data are done at a second position, even if the shutter button is prematurely depressed and the range finding data has not been obtained at the time of a second stroke, lens control is effected by a timer with a predetermined fixed time or by a timer at which a time limit is set corresponding to brightness. This results in a camera release device which produces a waiting time after the second position and till the lens control shutter and has a high range finding reliability. Thus the usefulness of the present invention is extensive.

What is claimed is:
1. A release control device for a camera having a shutter button comprising:
   (a) release means having a first switch which is changed from a first state to a second state by pressing the button to a first position and a second switch which is changed from a first state to a second state by pressing the button to a second position;
   (b) timer means for initiating a time count when the second switch is changed from the first state to the second state and for counting at least for a predetermined length of time;

(c) detection means for detecting that the counting time of the timer means reaches the predetermined length of time;
(d) a range finding device which initiates a range finding operation when the first switch is changed from the first state to the second state;
(e) switchover means for changing the length of time of the time count by the timer means to a predetermined length of time when the range finding device completes the range finding operation; and
(f) means for producing a signal for carrying out another camera operation when the detection means detects that the time count of the timer means has reached the predetermined time.

2. A release control device according to claim 1, in which the predetermined time of the timer means is arranged to vary such that it becomes long when an object brightness is dark and becomes short when the object brightness is bright.

3. A release control device according to claim 2, in which the timer means is a down counter to count clock pulses down from a moment the predetermined length of time is set.

4. A release device according to claim 3, in which the detection means is zero discriminating means to detect whether what is counted by the counter is zero or not.

5. A release device according to claim 3, in which the switchover means includes means to clear the counter.

6. A release device according to claim 4, wherein the switchover means includes means to clear the counter.

* * * * *